3,610,047
WASTE GAS SAMPLER
Hans List, 126 Heinrichstrasse, Graz, Austria, and Erich Schreiber, Graz, Austria; said Schreiber assignor to said List
Filed Mar. 18, 1970, Ser. No. 20,756
Claims priority, application Austria, Mar. 20, 1969, A 2,803/69
Int. Cl. G01n 1/24
U.S. Cl. 73—421.5 R                                          3 Claims

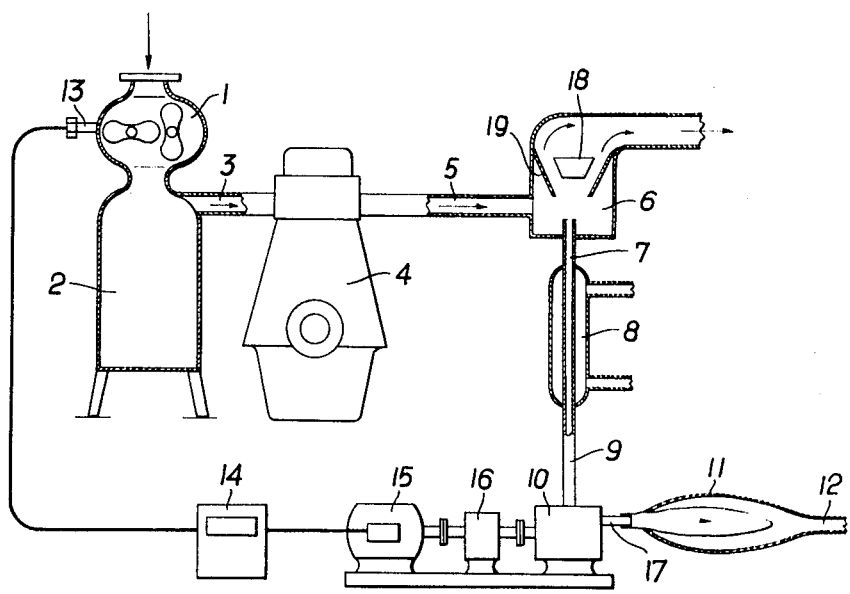

ABSTRACT OF THE DISCLOSURE

Device for the removal of waste gas samples from the exhaust pipe of internal combustion engines having a chamber connected to the exhaust pipe together with a pump and a motor drivingly connected with the pump. A sampling pipe has one end connected with the chamber and the other end connected to the suction side of the pump. A container connected to the delivery side of the pump receives the waste gas sample. A suction pipe is connected to the combustion engine with an equalizing tank communicating with the suction pipe. An air meter is series-connected with said equalization tank and a synchronizer is interposed between the air meter and the pump motor which regulates the speed of the pump motor proportionately to the speed of said air meter.

---

The invention relates to a device for the removal of waste gas samples from the exhaust pipe of an internal combustion engine, comprising a sampling pipe branching off the exhaust pipe and connected to the suction end of a power pump and a container receiving the waste gas sample and connectable to the delivery side of the pump.

In conventional waste gas sampling devices the whole of the waste gases produced by the internal combustion engine are usually collected in plastic bags over a reasonable period of time. The waste gas thus obtained is continuously analyzed for the purpose of ascertaining the total amount of noxious substances contained in the waste gas. However, this method is particularly disadvantageous on account of the large space required for the accommodation of the plastic bags to be filled with the total amount of waste gases, which renders both the handling and evaluation of the samples most difficult. Moreover, the time required for the sampling operation is comparatively long.

It is the purpose of the present invention to eliminate the drawbacks of conventional waste gas samplers by providing an improved and simplified device of this kind capable of supplying representative and readily analyzable waste gas samples. Accordingly, the invention provides for an air meter connected to the intake of the internal combustion engine with the interposition of a surge tank and for a synchronizer located between the air meter and the pump motor and serving to control the speed of the pump motor in proportion of the speed of the air meter.

With such an arrangement the pump always takes waste gas in an amount proportionate to the quantity of air drawn in irrespective of the load and speed of the internal combustion engine at any given moment. It is thus possible to determine the quantity of waste gas produced during any given period of time and the total of noxious components contained therein technically with a high degree of precision. At the same time, the space required for collecting the samples is much less than with conventional methods and the work of the analyst is greatly simplified and expedited. Speedier completion of both the sampling and analyzing procedures makes it possible to use a single expensive analyzer for a number of test stands, thereby reducing plant investment.

The device according to the invention also offers a valuable contribution towards recent efforts tending to eliminate air pollution prompted by legislative measures to be enacted in many countries calling for a limitation of the total amount of noxious components in waste gases produced during a certain operative cycle of the internal combustion engine.

According to a preferred embodiment of the invention the synchronizer comprises a pulse generator associated with the air meter and a speed-regulating device controlled by the transmitter pulses and series-connected to the driving motor of the pump. An electromagnetic pulse generator for example, can be used for the production of pulses. It cooperates with one or a plurality of ferromagnetic indicator elements attached to a rotating member of the air meter. However, the transmitter pulses can also be supplied by a photoelectric device.

In many cases it will be preferable according to the invention to provide a variable speed gearing between the pump and its driving motor. By appropriately selecting the transmission ratio of the variable speed gearing it is possible to establish any desired relationship between the speeds of the air meter and of the driving motor of the pump. However, the variable speed gearing may also serve to trigger the taking of waste gas samples after a predetermined period of time or operational cycle.

Further details of the invention will appear from the following description of an embodiment of the invention with reference to the accompanying drawing schematically illustrating the general layout of a waste gas sampler according to the invention.

The apparatus shown comprises an air meter 1 of conventional design, connected to the suction pipe 3 of the internal combustion engine 4 whose waste gases are to be analyzed, with the interposition of an equalizing tank 2. The exhaust pipe 5 of the internal combustion engine 4 terminates in a chamber 6 from where a sampling pipe 7 branches off. The sampling pipe 7 extends through a waste gas cooler 8, its other end being connected to the suction side of a motor driven pump 10.

A temperature feeler 9 provided in the sampling pipe 7 between the waste gas cooler 8 and the pump 10 serves to monitor the temperature of the waste gas sample and is also used, if necessary, for controlling the temperature of the waste gas cooler 8.

At its delivery side, the pump 10 carries a pipe connection 17 to which a double-walled plastic bag 11 receiving the waste gas sample can be attached. In order to ensure complete evacuation of the waste gas sample during the connection of the plastic bag to the analyzer (not shown in the drawing), the outer envelope of the plastic bag 11 has an opening 12 through which compressed air can be introduced.

Associated with the air meter 1 is a pulse generator 13 which is excited by means of an indicator element (not shown) rotating at the same speed as the air meter. The pulses produced by the pulse generator 13 are transmitted to a speed regulator 14 associated with the driving motor 15 of the pump 10. The motor 15 drives the pump 10 via an interposed governor gearing 16.

The apparatus also comprises a device for maintaining the waste gas pressure in the chamber 6 on a constant level. This device consists of a floating body 18 capable of freely floating above a conical insert 19 of the chamber 6 and controlling the exhaust aperture for the waste gases in the chamber 6 in such a manner that the waste gas pressure in the chamber 6 will remain at least approximately on a constant level whatever the load and speed of the internal combustion engine 4.

The operation of the device according to the invention is as follows: With the internal combustion engine 4 running, the speed of the air meter 1 is the measure for the rate of air flow in the engine at a given moment. The pulse generator 13 delivers a number of pulses the number per unit of time of which is proportional to the speed of the air meter 1 and consequently, to the rate of air flow. The transmitter pulses act upon the speed regulator 14 in such a manner that the driving motor 15 of the pump 10 will rotate at a speed which is proportionate to the rate of air flow in the internal combustion engine. Consequently, the pump 10 extracts from the chamber 6 a quantity of waste gas which is proportionate to the amount of air drawn in at the same time, irrespectively of the given speed and load of the internal combustion engine 4. The relationship between the amount of waste gas on the one hand, and the amount of air drawn in on the other hand, can be predetermined by means of the governor gearing 16. It is thus possible to obtain also over a very short period of operation a representative waste gas sample of a very small volume to be accommodated in a plastic bag 11 of minimum size.

A number of variants of the embodiment of the invention hereabove described with reference to the accompanying drawing are possible within the scope of the present invention. For example, the driving speed of the pump motor might be synchronized with the speed of the air meter also by means of a photoelectric scanner. Likewise, it would be possible to use an air meter of a type other than the one shown in connection with the device according to the invention.

We claim:

1. A device for the removal of waste gas samples from the exhaust pipe of an internal combustion engine, comprising a chamber connected to the said exhaust pipe, a pump, a motor drivingly connected with the said pump, a sampling pipe, one end of same being connected with the said chamber, the other end of the sampling pipe being connected to the suction side of the said pump, a container receiving the said waste gas sample, connectable to the delivery side of the said pump, a suction pipe on the said internal combustion engine, an equalizing tank communicating with the said suction pipe, an air meter, series-connected with the said equalizing tank, a synchronizer interposed between the air meter and the said pump motor and regulating the speed of the pump motor proportionately to the speed of the said air meter.

2. A device according to claim 1, wherein the said synchronizer comprises a pulse generator mounted on the said air meter and supplying per unit of time a number of pulses proportionate to the speed of the air meter, and a speed regulator series-connected with the said pump motor and controlled by the said pulses of the pulse generator.

3. A device according to claim 1, comprising a variable gearing interposed between the said pump motor and the pump.

References Cited

UNITED STATES PATENTS

| 2,013,998 | 9/1935 | Goldsborough | 73—421.5 X |
| 2,077,538 | 4/1937 | Wait | 73—421.5 X |
| 2,112,845 | 4/1938 | Howell | 73—421.5 |
| 2,245,679 | 6/1941 | Kelley | 73—421.5 |
| 3,461,727 | 8/1969 | Everhard et al. | 73—421.5 |

LOUIS R. PRINCE, Primary Examiner

W. A. HENRY II, Assistant Examiner

U.S. Cl. X.R.

73—116